(12) United States Patent
Greenblatt et al.

(10) Patent No.: US 7,613,712 B2
(45) Date of Patent: *Nov. 3, 2009

(54) METHODS AND APPARATUS FOR IDENTIFYING RELATED NODES IN A DIRECTED GRAPH HAVING NAMED ARCS

(75) Inventors: Howard Greenblatt, Wayland, MA (US); Alan Greenblatt, Sudbury, MA (US); David A. Bigwood, Sudbury, MA (US); Colin P. Britton, Lexington, MA (US)

(73) Assignee: Metatomix, Inc., Dedham, MA (US)

( * ) Notice: Subject to any disclaimer, the term of this patent is extended or adjusted under 35 U.S.C. 154(b) by 241 days.

This patent is subject to a terminal disclaimer.

(21) Appl. No.: 11/245,994

(22) Filed: Oct. 7, 2005

(65) Prior Publication Data

US 2007/0198454 A1 Aug. 23, 2007

Related U.S. Application Data

(63) Continuation of application No. 10/680,049, filed on Oct. 7, 2003, now Pat. No. 6,954,749.

(60) Provisional application No. 60/416,616, filed on Oct. 7, 2002.

(51) Int. Cl.
*G06F 17/00* (2006.01)
(52) U.S. Cl. ...................................... 707/100
(58) Field of Classification Search ................ 707/100, 707/1, 2, 3, 4, 10, 102, 103 Y, 200
See application file for complete search history.

(56) References Cited

U.S. PATENT DOCUMENTS 4,701,130 A 10/1987 Whitney et al.

(Continued)

FOREIGN PATENT DOCUMENTS

WO WO 97/22096 6/1997

(Continued)

OTHER PUBLICATIONS

Berniers-Lee et al. RFC 2396: Uniform Resource Identifiers (URI): Generic Syntax (Aug. 1998) http://www.cs.tut.fi/.about.jkorpela/rfc/2396/full.html, 23 pages, downloaded on Feb. 20, 2003.

(Continued)

*Primary Examiner*—Fred I Ehichioya
(74) *Attorney, Agent, or Firm*—Nutter McClennen & Fish LLP; Joshua T. Mall; David J. Powsner

(57) ABSTRACT

The invention provides methods for identifying related data in a directed graph (e.g., an RDF data set). A "first" in step—though the steps are not necessarily executed in sequential order—includes identifying (or marking) as related data expressly satisfying the criteria. A "second" step includes identifying as related ancestors of any data identified as related, e.g., in the first step, unless that ancestor conflicts with the criteria. A "third" step of the method is identifying descendents of any data identified, e.g., in the prior steps, unless that descendent conflicts with the criteria or has a certain relationship with the ancestor from which it descends. The methods generates, e.g., as output, an indication of each of the nodes identified as related in the three steps.

10 Claims, 5 Drawing Sheets

U.S. PATENT DOCUMENTS

| | | |
|---|---|---|
| 4,895,518 A | 1/1990 | Arnold et al. |
| 4,953,106 A | 8/1990 | Gansner |
| 5,119,465 A | 6/1992 | Jack et al. |
| 5,129,043 A * | 7/1992 | Yue .............................. 706/60 |
| 5,199,068 A | 3/1993 | Cox |
| 5,259,766 A | 11/1993 | Sack et al. |
| 5,267,865 A | 12/1993 | Lee et al. |
| 5,270,920 A | 12/1993 | Pearse et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson |
| 5,374,932 A | 12/1994 | Wyschogrod |
| 5,379,387 A | 1/1995 | Carlstedt |
| 5,381,332 A | 1/1995 | Wood |
| 5,395,243 A | 3/1995 | Lubin et al. |
| 5,421,730 A | 6/1995 | Lasker, III et al. |
| 5,450,480 A | 9/1995 | Man |
| 5,463,682 A | 10/1995 | Fisher |
| 5,499,293 A | 3/1996 | Behram et al. |
| 5,519,618 A | 5/1996 | Kastner |
| 5,548,506 A | 8/1996 | Srinivasan |
| 5,579,486 A | 11/1996 | Oprescu |
| 5,597,312 A | 1/1997 | Bloom et al. |
| 5,608,789 A | 3/1997 | Fisher |
| 5,655,118 A | 8/1997 | Heindel et al. |
| 5,732,192 A | 3/1998 | Malin |
| 5,745,753 A | 4/1998 | Mosher, Jr. |
| 5,761,063 A | 6/1998 | Jannette et al. |
| 5,765,140 A | 6/1998 | Knudson et al. |
| 5,788,504 A | 8/1998 | Rice et al. |
| 5,795,155 A | 8/1998 | Morrel-Samuels |
| 5,809,212 A | 9/1998 | Shasha |
| 5,822,780 A | 10/1998 | Schutzman |
| 5,826,077 A * | 10/1998 | Blakeley et al. ................. 707/4 |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi |
| 5,873,076 A | 2/1999 | Barr et al. |
| 5,875,441 A * | 2/1999 | Nakatsuyama .................. 707/1 |
| 5,907,837 A | 5/1999 | Ferrel et al. |
| 5,974,441 A | 10/1999 | Rogers et al. |
| 5,974,443 A | 10/1999 | Jeske |
| 5,983,267 A | 11/1999 | Shklar et al. |
| 5,987,415 A | 11/1999 | Breese |
| 5,995,958 A | 11/1999 | Xu |
| 6,012,098 A | 1/2000 | Bayeh et al. |
| 6,035,412 A | 3/2000 | Tamer et al. |
| 6,044,373 A | 3/2000 | Gladney et al. |
| 6,044,466 A | 3/2000 | Anand |
| 6,078,982 A * | 6/2000 | Du et al. ..................... 710/200 |
| 6,085,188 A * | 7/2000 | Bachmann et al. ............. 707/3 |
| 6,094,652 A | 7/2000 | Faisal |
| 6,122,632 A | 9/2000 | Botts et al. |
| 6,125,363 A | 9/2000 | Buzzeo et al. |
| 6,130,679 A | 10/2000 | Chen |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare |
| 6,154,738 A | 11/2000 | Call |
| 6,177,932 B1 | 1/2001 | Galdes et al. |
| 6,182,085 B1 | 1/2001 | Eichstaedt |
| 6,185,516 B1 | 2/2001 | Hardin |
| 6,185,534 B1 | 2/2001 | Breese |
| 6,212,502 B1 | 4/2001 | Ball |
| 6,240,417 B1 | 5/2001 | Eastwick et al. |
| 6,243,713 B1 | 6/2001 | Nelson et al. |
| 6,246,320 B1 | 6/2001 | Monroe |
| 6,308,163 B1 | 10/2001 | Du et al. |
| 6,330,554 B1 | 12/2001 | Altschuler et al. |
| 6,341,277 B1 | 1/2002 | Coden et al. |
| 6,360,330 B1 | 3/2002 | Mutalik et al. |
| 6,369,819 B1 | 4/2002 | Pitkow |
| 6,381,738 B1 | 4/2002 | Choi |
| 6,389,429 B1 | 5/2002 | Kane et al. |
| 6,389,460 B1 | 5/2002 | Stewart et al. |
| 6,393,423 B1 | 5/2002 | Goedken |
| 6,405,211 B1 * | 6/2002 | Sokol et al. ............... 707/103 Y |
| 6,405,251 B1 | 6/2002 | Bullard |
| 6,415,283 B1 * | 7/2002 | Conklin ......................... 707/3 |
| 6,418,413 B2 | 7/2002 | DeMarcken et al. |
| 6,418,448 B1 | 7/2002 | Sarkar |
| 6,427,151 B1 | 7/2002 | Chan et al. |
| 6,429,870 B1 | 8/2002 | Chen |
| 6,437,799 B1 | 8/2002 | Shinomi |
| 6,446,200 B1 | 9/2002 | Ball |
| 6,446,256 B1 | 9/2002 | Hyman et al. |
| 6,463,440 B1 | 10/2002 | Hind et al. |
| 6,496,833 B1 | 12/2002 | Goldberg et al. |
| 6,509,898 B2 | 1/2003 | Chi |
| 6,530,079 B1 | 3/2003 | Choi |
| 6,539,374 B2 | 3/2003 | Jung |
| 6,542,912 B2 | 4/2003 | Meltzer |
| 6,546,406 B1 | 4/2003 | Derose et al. |
| 6,556,983 B1 | 4/2003 | Altschuler et al. |
| 6,577,769 B1 | 6/2003 | Kenyon |
| 6,583,800 B1 | 6/2003 | Ridgley |
| 6,594,662 B1 | 7/2003 | Sieffert et al. |
| 6,598,043 B1 | 7/2003 | Baclawski |
| 6,606,613 B1 | 8/2003 | Altschuler |
| 6,625,657 B1 | 9/2003 | Bullard |
| 6,636,848 B1 | 10/2003 | Aridor et al. |
| 6,640,284 B1 | 10/2003 | Shaw et al. |
| 6,643,638 B1 | 11/2003 | Xu |
| 6,643,652 B2 | 11/2003 | Hekgeson et al. |
| 6,678,679 B1 | 1/2004 | Bradford |
| 6,701,314 B1 | 3/2004 | Conover et al. |
| 6,721,747 B2 | 4/2004 | Lipkin |
| 6,725,227 B1 | 4/2004 | Li |
| 6,751,663 B1 | 6/2004 | Farrell |
| 6,757,708 B1 | 6/2004 | Craig et al. |
| 6,772,148 B2 | 8/2004 | Baclawski |
| 6,778,971 B1 | 8/2004 | Altschuler |
| 6,792,420 B2 | 9/2004 | Chen et al. |
| 6,804,688 B2 | 10/2004 | Kobayashi et al. |
| 6,901,438 B1 | 5/2005 | Davis et al. |
| 6,925,457 B2 | 8/2005 | Britton et al. |
| 7,047,411 B1 | 5/2006 | DeMello et al. |
| 7,117,260 B2 | 10/2006 | Bimson et al. |
| 7,171,415 B2 | 1/2007 | Kan et al. |
| 7,289,793 B2 | 10/2007 | Norwood et al. |
| 7,313,588 B1 | 12/2007 | Shotton, Jr. et al. |
| 2001/0047355 A1 | 11/2001 | Anwar |
| 2002/0049603 A1 | 4/2002 | Mehra et al. |
| 2002/0049788 A1 | 4/2002 | Lipkin et al. |
| 2002/0059566 A1 | 5/2002 | Delcambre et al. |
| 2002/0078030 A1 | 6/2002 | Iwayama et al. |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0118688 A1 * | 8/2002 | Jagannathan ................ 370/410 |
| 2002/0120598 A1 | 8/2002 | Shadmon et al. |
| 2002/0133502 A1 | 9/2002 | Rosenthal et al. |
| 2002/0143759 A1 | 10/2002 | Yu |
| 2002/0178232 A1 | 11/2002 | Ferguson |
| 2003/0004934 A1 | 1/2003 | Qian |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |

| | | | |
|---|---|---|---|
| 2003/0061209 A1* | 3/2003 | Raboczi et al. | 707/3 |
| 2003/0074352 A1* | 4/2003 | Raboczi et al. | 707/4 |
| 2003/0074369 A1 | 4/2003 | Scheutze et al. | |
| 2003/0109951 A1 | 6/2003 | Hsiung et al. | |
| 2003/0229529 A1 | 12/2003 | Mui et al. | |
| 2004/0034651 A1 | 2/2004 | Gupta et al. | |
| 2005/0055330 A1 | 3/2005 | Britton et al. | |
| 2005/0060372 A1 | 3/2005 | DeBettencourt et al. | |
| 2005/0125683 A1 | 6/2005 | Matsuyama et al. | |
| 2006/0271563 A1 | 11/2006 | Angelo et al. | |

FOREIGN PATENT DOCUMENTS

| | | |
|---|---|---|
| WO | WO 98/05018 | 2/1998 |
| WO | WO 98/10399 | 3/1998 |
| WO | WO 98/24020 | 6/1998 |
| WO | WO 99/27460 | 6/1999 |

OTHER PUBLICATIONS

Forgy, Charles L. "Rete: A Fast Algorithm for the Many Pattern/Many Object Pattern Match Problem," Artifical Intelligence vol. 19 (1982) pp. 17-37.
Melnik, Sergey, "Storing RDF in a relational database," http://www-db.stanford.edu/.about.melnik/rdf/db.html, 5 pages, downloaded on 20/20/2003.
Quinlan, J. R., "Induction of Decision Trees," Machine Learning vol. 1 (1986) pp. 18-106.
Resource Description Framework (RDF) Model and Syntax Specification W3C Recommendation (Feb. 22, 1999) http://www.w3.org.TR/1999/REC-rdf-syntax-19990222/, 34 pages, downloaded on Feb. 20, 2003.
"The Rete Algorithm," http://herzberg.ca.sandia.gov/jess/docs/52/rete.html, 3 pages, downloaded on Feb. 20, 2003.
"Inkling: RDF Query Using SquishQL," downloaded from http://swordfish.rdfweb.org/rdfquery/ on Mar. 20, 2003, 2 pages.
"rdfDB Query Language," downloaded from http://www.guha.com/rdfdb/query.html on Mar. 20, 2003, 4 pages.
"RDQL—RDF Data Query Language," Hewlett-Packard Company, .COPYRGT. 1994-2003, downloaded from http://www.hpl.hp.com/semweb/rdql.htm on Mar. 20, 2003, 3 pages.
Card et al., "Readings in Information Visualizing Using Vision to Think", 1999, Morgan Kaufmann, p. 298.
"The Surveillance and Monitoring Component of the Public Health Information Network", website for the Centers for Disease Control and Prevention, http://www.cdc.gov/nedss, printed Nov. 14, 2005, 2 pages.
"An Overview of the NEDSS Initiative", website for the Centers for Disease Control and Prevention, http://www.cdc.gov/nedss/About/overview.html, printed Nov. 14, 2005, 2 pages.
"Background on Public Health Surveillance", website for the Centers for Disease Control and Prevention, http://www.cdc.gov/nedss/About/purpose.htm, printed Nov. 14, 2005, 3 pages.
"Description of the NEDSS Base System," Mar. 28, 2001, 5 pages.
"NEDSS Base System Fact Sheet", website for the Centers for Disease Control and Prevention, 2 pages.
"NEDSS Logical Data Model (NLDM) Overview and Users' Guide", Version 1.0, 92 pages.
"NEDSS Systems Architecture", Version 2.0, Apr. 15, 2001, 5 pages.
"NEDSS and NEDSS PAMs Business Discovery Statement", Version 1.2, Mar. 9, 2002, 23 pages.
"Overview of PHIN", Centers for Disease Control and Prevention website, http://www.cdc.gov/phin, printed Jan. 18, 2005, 3 pages.
Public Health Information Network, The Association of State and Territorial Health Officials website, http://www.astho.org/?template=public_health_info_network.html, printed Jan. 18, 2005, 2 pages.
"Maestro™ Public Health Suite," Orion International website, http://www.orionhealth.com/maestro_overview.htm, printed Jan. 18, 2005, 3 pages.
Published International Search Report (published May 24, 2007) and Written Opinion (mailed Mar. 12, 2007) for PCT/US05/005725.
Larry Kerschberg, Knowledge Management in Heterogeneous Data Warehouse Environment, Pub. 2001.
Gregory Karvounarakis et al., "Querying Community Web Portals", Sigmod Pub, Pub. 2000.
Bernd Amann et al., Integrating ontologies and thesauri for RDF schema creation and metadata querying, Mar. 6, 2001.
"Resource Description Framework (RDF) Model and Syntax Specification", W3C Recommendation, Feb. 22, 1999.
Kerstin Forsberg et al. Extensible use of RDF in a business context. Computer Networks: The International Journal of Computer and Telecommunications Networking . Published Jun. 2000.
Terence Critchlow. Report on XEWA-00: the XML enabled wide-area searches for bioinformatics workshop. ACM> vol. 30 , Issue 1 (Mar. 2001).
M. R. Kogalovsky. Systematization of information resources collections in digital libraries. MAIK Nauka/Interperiodica distributed exclusively by Springer Science+Business Media LLC. vol. 26, No. 3 / May 2000.
Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 2, 2001-Apr. 6, 2001.
S. Alexaki et al. Managing RDF Metadata for Community Webs. Springer Berlin / Heidelberg. vol. 1921/2000, pp. 140-151.
Semantic Web Workshop: Models, Architectures and Management, Sep. 21, 2000 Conference Review, Intelligence Summer 2001.
Office Action, U.S. Appl. No. 11/064,438,Mailed Aug. 12, 2008.
Office Actions, U.S. Appl. No. 10/886,515, Mailed Aug. 1, 2008.
Office Action, U.S. Appl. No. 11/064,438, Apr. 29, 2008.
Office Actions, U.S. Appl. No. 10/886,515, Mailed May 1, 2009.
Thompson, Craig "Workshop on Compositional Software Architectures Workshop Report," Software Engineering Notes, vol. 23. No. 3, May 1998.
Takeda, Koichi, "Site Outlining," IBM Research, Tokyo Research Lab, 1623-14; Mar. 1998.
Bucher, Alex et al. "Discovering Internet Marketing Intelligence through Online Analytical Web Usage Mining," SIGMOD Record, vol. 27, No. 4, Dec. 1998.
Ouksel, Aris et al. "Semantic Interoperability in Global Information Systems," SIGMOD Record, vol. 28, No. 1, Mar. 1999.
Sycara, Katia et al. "Dynamic Service Matchmaking Among Agents in Open Information," SIGMOD Record, vol. 28, No. 1, Mar. 1999.
Buneman et al "Interaction between Path and Type Constraints", Proceedings of ACM Symposium on Principles of Database Systems, 1999, pp. 56-67.
Swick, Ralph, "RDF:Weaving the Web of Discovery: Putting it Together," netWorker archive, vol. 3, Issue 2 (Jun. 1999) , pp. 21-25 , Year of Publication: 1999, ISSN:1091-3556.
Suciu, Dan "Managing Web Data," ACM SIGMOD Record archive, vol. 28 , Issue 2 (Jun. 1999), p. 510 , Year of Publication: 1999, ISSN:0163-5808.
Crestani, Fabio "Vocal Access to a Newspaper Archive: Design Issues and Preliminary Investigations," International Computer Science Institute; Mar. 1999.
McGrath et al, "Digital Library Technology for Locating and Accessing Scientific Data," International Conference on Digital Libraries , Proceedings of the fourth ACM conference on Digital libraries , Berkeley, California, United States , pp. 188-194 , Year of Publication: 1999 . ISBN:1-58113-145-3.
Thomas Lee, et al "Information integration with attribution support for corporate profiles," Information integration with attribution support for corporate profiles, Conference on Information and Knowledge Management, Proceedings of the eighth international conference on Information and knowledge management , Kansas City, Missouri, United States , pp. 423-429 ,Year of Publication: 1999, ISBN:1-58113-146-1.
Tudhope et al "Semantically Indexed Hypermedia: Linking Information Disciplines," ACM Computing Surveys (CSUR), vol. 31, Issue 4es (Dec. 1999), Article No. 4, Year of Publication: 1999 , ISSN:0360-0300.
Bonifati, "Comparative Analysis of Five XML Query Languages," SIGMOD Record, vol. 29, No. 1, Mar. 2000.
Carr, Leslie et al. "The Evolution of Hypertext Link Services," ACM Computing Surveys, vol. 31, No. 4es, Dec. 1999.

Fan, Wenfei, "Integrity Constraints for XML," ACM Symposium on Principles of Database Systems archive Proceedings of the nineteenth ACM SIGMOD-SIGACT-SIGART symposium on Principles of database systems; Dallas, Texas, United States; pp. 23-34 ; Year of Publication: 2000.

Chen, James et al "A Distributed Multi-Agent System for Collaborative Information Management and Sharing," RBAC 2000, Berlin, Germany ISBN 1-58113-259-x/00/07; 2000.

Melnik, Sergey "A Mediation Infrastructure for Digital Library Services," Digital Libraries, San Antonio, TX ACM 2000-581 13-231 x/00/0006; 2000.

Melnik, Sergey "Building a Distributed Full-Text Index of the Web," WWW10, May 1-5, 2001, Hong Kong ACM 1-58113-348-0/01/00005.

Conference Review Department, "Semantic Web Workshop: Models, Architectures and Management of Sep. 21, 2000" Intelligence, Summer 2001, pp. 39-44.

Brickley, Dan "Semantic Web History: Nodes and Arcs 1989-1999," The WWW Proposal and RDF, revised Mar. 2001 http:www.w3.org/1999/11/11-WWWProposal/.

Halpin, Harry et al "W3C Semantic Web Activity," W3C Sematic Web, http://www.w3.org/2001/sw/; last updated Apr. 6, 2009, copyright 1994-2009.

Prudhommeaux, Eric "Check and Visualize your RDF," W3C website, Feb. 15, 2007, http://www.w3.org/RDF/Validator/.

RDF Interest Group 1999-2004, available at W3C Semantic Web, http://www.w3.org/RDF/Interest/ ; last updated 2005/12/08; downloaded Apr. 2009.

Berners-Lee, Tim "Information Management: A Proposal," Mar. 1989 and May 1990; 14 pages.

Beckett, Dave Dave Beckett's Resource Description Framework (RDF) Resource Guide, available at http://planetrdf.com/guide, last updated Sep. 23, 2005, 26 pages.

Brickley, Dan "RDF Query in Javascript demo," W3C website, Jul. 28, 2001, http://www.w3.org/1999/11/11-WWWProposal/rdfqdemo.html.

Extensible Markup Language (XML), W3C Sematic Web, http://www.w3.org/XML/ ; last updated Apr. 5, 2009; copyright 1996-2003; 5 pages.

Berniers-Lee et al, "The Enquire Manual," Oct. 1980, http://infomesh.net/2001/enquire/manual/.

Dublin Core Metadata Initiative, available at http://dublincore.org, web page last updated Mar. 31, 2009, copyright 1995-2009; 1 page.

Resource Description Framework, (RDF) Schema Specification, W3C Proposed Recommendation Mar. 3, 1999, http://www.w3.org/TR/1999/PR-rdf-schema-19990303/.

Berners-Lee et al "Web Architecture: Describing and Exchanging Data," W3C Recommendations, Jun. 7, 1999, http://www.w3.org/1999/06/07-WebData.

Berners-Lee, "Semantic Web Road Map," W3C Recommendations, Sep. 1998, http://www.w3.org/DesignIssues/Semantic.html.

Lassila, et al "Resource Description Framework (RDF) Model and Syntax Specification," W3C Recommendations, Feb. 22, 1999.

Berners-Lee, "What a semantic web can represent," W3C Recommendations, Sep. 1998.

Fensel, D. "Ontobroker: Or How to Enable Intelligent Access to the WWW," Proceedings of the 11th Banff Knowledge Acquisition for Knowledge-Based System Workshop (KAW98), Banaff, Kanada, Apr. 1998.

Swick, R. "The Cambridge Communique," W3C Recommendations, Oct. 1999, http://www.w3.org/TR/schema-arch.

Technical Reports and Communications, W3C website, Apr. 17, 2009, http://www.w3.org/TR/.

Bray, Tim et al. "Extensible Markup Language," W3C Recommendations, Feb. 10, 1998, http://www.w3.org/ TR/1998/REC-xml-19980210.

Cowan, John et al. "XML Information Set," W3C Recommendations, May 17, 1999, http://www.w3.org/TR/1999/WD-xml-infoset-19990517.

Extensible Markup Language Activity Statement , W3C Ubiquitous Web, http://www.w3.org/XML/Activity; downloaded Apr. 10, 2009; 3 pages.

Clark, James Editor "XSL Transformations," W3C Recommendations, Nov. 16, 1999, http://www.w3.org/TR/xslt.

Manola, Frank Editor "RDF Primer," W3C Working Draft, Mar. 2002, http://www.w3.org/TR/2002/WD-rdf-primer-20020319/.

Malhotra, Ashok et al., "XML Schema Requirements," W3C Note, Feb. 15, 1999, http://www.w3.org/TR/NOTE-xml-schema-req.

Web site; http://www.w3.org/DesignIssues/RDFnot.html ; Sep. 27, 2004 ; 8 pages.

Supplemental European Search Report dated Aug. 21, 2007 (5 pages).

Miller, Eric et al., RDF Primer, W3C @@ Editor's Draft Jan. 27, 2002 @@, Copyright 2001, 2002 (MIT,INRIA, Keio) (22 pages).

Six, Janet, M. et al, "Effective eGraph Visualization Via Node Grouping", Proceedings of the IEEE Symposium on Information Visualization 2001 (INFOVIS'01) (8 pages).

Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. on Practical Aspects of Knowledge Management (PAKM2000) Basel, Swwitzerland, Oct. 30-31, 2000, (U.Reimer, ed.).

* cited by examiner

US 7,613,712 B2

METHODS AND APPARATUS FOR IDENTIFYING RELATED NODES IN A DIRECTED GRAPH HAVING NAMED ARCS

This application is a continuation of U.S. patent application Ser. No. 10/680,049, filed Oct. 7, 2003, entitled "Methods and Apparatus for Identifying Related Nodes In A Directed Graph Having Named Arcs", which claims the benefit of priority of U.S. Provisional Application No. 60/416,616, filed Oct. 7, 2002, entitled "Methods And Apparatus For Identifying Related Nodes In A Directed Graph Having Named Arcs," the teachings of which are incorporated herein by reference.

BACKGROUND OF THE INVENTION

The invention pertains to digital data processing and, more particularly, to methods and apparatus for identifying subsets of related data in a data set. The invention has application, for example, in enterprise business visibility and insight using real-time reporting tools.

It is not uncommon for a single company to have several database systems—separate systems not interfaced—to track internal and external planning and transaction data. Such systems might have been developed at different times throughout the history of the company and are therefore of differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise business visibility is the consolidation of these disparate legacy databases with one another and with newer databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

Even where data from disparate databases can be consolidated, e.g., through data mining, directed queries, brute-force conversion and combination, or otherwise, it may be difficult (if not impossible) to use. For example, the manager of a corporate marketing campaign may be wholly unable to identify relevant customers from a listing of tens, hundreds or even thousands of pages of consolidated corporate ERP, e-commerce, marketing and other data.

An object of this invention is to provide improved methods and apparatus for digital data processing and, more particularly, for identifying subsets of related data in a data set.

A related object is to provide such methods and apparatus as facilitate enterprise business visibility and insight.

A further object is to provide such methods and apparatus as can rapidly identify subsets of related data in a data set, e.g., in response to user directives or otherwise.

A further object of the invention is to provide such methods and apparatus as can be readily and inexpensively implemented.

SUMMARY OF THE INVENTION

The foregoing are among the objects attained by the invention which provides, in one aspect, a method for identifying related data in a directed graph, such as an RDF data set. A "first" step—though the steps are not necessarily executed in sequential order—includes identifying (or marking) as related data expressly satisfying a criteria (e.g., specified by a user). A "second" step includes identifying as related ancestors of any data identified as related, e.g., in the first step, unless that ancestor conflicts with the criteria. A "third" step of the method is identifying descendents of any data identified, e.g., in the prior steps, unless that descendent conflicts with the criteria or has a certain relationship with the ancestor from which it descends. The methods generates, e.g., as output, an indication of each of the nodes identified as related in these steps.

By way of example, in the first step, a method according to this aspect of the invention can identify nodes in the directed graph that explicitly match a criteria in the form field1=value1, where field1 is a characteristic (or attribute) of one or more of the nodes and value1 is a value of the specific characteristic (or attribute). Of course, criteria are specific to the types of data in the data set and can be more complex, including for example, Boolean expressions and operators, wildcards, and so forth. Thus, for example, a criteria of a data set composed of RDF triples might be of the form predicate=CTO and object=Colin, which identifies, as related, triples having a predicate "CTO" and an object "Colin."

By way of further example, in second step, the method "walks" up the directed graph from each node identified as related in first step (or any of the steps) to find ancestor nodes. Each of these is identified as related unless it conflicts with the criteria. To continue the example, if the first step marks as related a first RDF triple that matches the criteria predicate=CTO and object=Colin, the second step marks as related a second, parent triple whose object is the subject of the first triple, unless that second (or parent) triple otherwise conflicts with the criteria, e.g., has another object specifying that Dave is the CTO.

By way of further example, in the third step, the method walks down the directed graph from each node identified in the previously described steps (or any of the steps) to find descendent nodes. Each of these is identified as related unless (i) it conflicts with the criteria or (ii) its relationship with the ancestor from which walking occurs is of the same type as the relationship that ancestor has with a child, if any, from which the ancestor was identified by operation of the second step. To continue the example, if the first step marks as related a first RDF triple that matches the criteria predicate=CTO and object=Colin and the second step marks as related a second, parent triple whose object is the subject of the first triple via a predicate relationship "Subsidiary," the third step marks as related a third, descendent triple whose subject is the object of the second, parent triple, unless that descendent triple conflicts with the criteria (e.g., has a predicate-object pair specifying that Dave is the CTO) or unless its relationship with the parent triple is also defined by a predicate relationship of type "Subsidiary."

As evident in the discussion above, according to some aspects of the invention, the data are defined by RDF triples and the nodes by subjects (or resource-type objects) of those triples. In other aspects, the data and nodes are of other data types—including, for example, meta directed graph data (of the type defined in one of the aforementioned incorporated-by-reference applications) where a node represents a plurality of subjects each sharing a named relationship with a plurality of objects represented by a node.

Still further aspects of the invention provide methods as described above in which the so-called first, second and third steps are executed in parallel, e.g., as by an expert system rule-engine. In other aspects, the steps are executed in series and/or iteratively.

In still further aspects of the invention, the invention provides methods for identifying related data in a directed graph by exercising only the first and second aforementioned steps. Other aspects provide such methods in which only the first and third such steps are exercised.

Still other aspects of the invention provide methods as described above in which the directed graph is made up of, at least in part, a data flow, e.g. of the type containing transactional or enterprise data. Related aspects provide such methods in which the steps are executed on a first portion of a directed graph and, then, separately on a second portion of the directed graph, e.g., as where the second portion reflects updates to a data set represented by the first portion.

These and other aspects are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
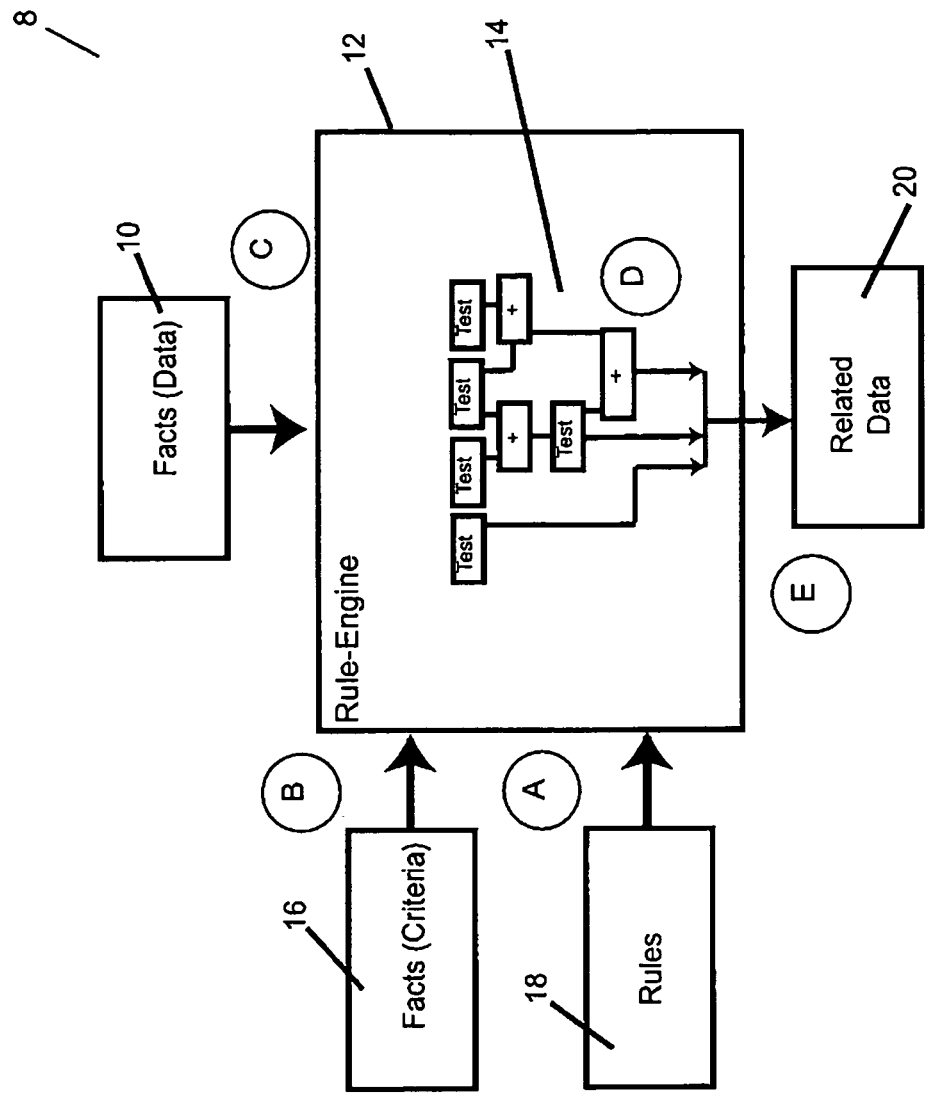
FIG. 1 is a block diagram of a system according to the invention for identifying related data in a data set.

FIG. 1 depicts a system 8 according to the invention for identifying and/or generating (collectively, "identifying") a subset of a directed graph, namely, that subset matching or related to a criteria. The embodiment (and, more generally, the invention) is suited for use inter alia in generating subsets of RDF data sets consolidated from one or more data sources, e.g., in the manner described in the following copending, commonly assigned application, the teachings of which are incorporated herein by reference U.S. patent application Ser. No. 09/917,264, filed Jul. 27, 2001, entitled "Methods and Apparatus for Enterprise Application Integration,"

U.S. patent application Ser. No. 10/051,619, filed Oct. 29, 2001, entitled "Methods And Apparatus For Real-time Business Visibility Using Persistent Schema-less Data Storage,"

U.S. Patent Application Number Ser. No. 60/332,219, filed Nov. 21, 2001, entitled "Methods And Apparatus For Calculation And Reduction Of Time-series Metrics From Event Streams Or Legacy Databases In A System For Real-time Business Visibility," and U.S. Patent Application Number Ser. No. 60/332,053, filed Nov. 21, 2001, entitled "Methods And Apparatus For Querying A Relational Database Of RDF Triples In A System For Real-time Business Visibility."

The embodiment (and, again, more generally, the invention) is also suited inter alia for generating subsets of "meta" directed graphs of the type described in copending, commonly assigned application U.S. patent application Ser. No. 10/138,725, filed May 3, 2002, entitled "Methods And Apparatus for Visualizing Relationships Among Triples of Resource Description Framework (RDF) Data Sets," the teachings of which are incorporated herein by reference.

The illustrated system 8 includes a module 12 that executes a set of rules 18 with respect to a set of facts 16 representing criteria in order to generate a subset 20 of a set of facts 10 representing an input data set, where that subset 20 represents those input data facts that match the criteria or are related thereto. For simplicity, in the discussion that follows the set of facts 16 representing criteria are referred to as "criteria" or "criteria 16," while the set of facts 10 representing data are referred to as "data" or "data 10." The illustrated system 8 is implemented on a general- or special-purpose digital data processing system, e.g., a workstation, server, mainframe or other digital data processing system of the type conventionally available in the marketplace, configured and operated in accord with the teachings herein. Though not shown in the drawing, the digital data processing system can be coupled for communication with other such devices, e.g., via a network or otherwise, and can include input/output devices, such as a keyboard, pointing device, display, printer and the like.

Illustrated module 12 is an executable program (compiled, interpreted or otherwise) embodying the rules 18 and operating in the manner described herein for identifying subsets of directed graphs. In the illustrated embodiment, module 12 is implemented in Jess (Java Expert System Shell), a rule-based expert system shell, commercially available from Sandia National Laboratories. However it can be implemented using any other "expert system" engine, if-then-else network, or other software, firmware and/or hardware environment (whether or not expert system-based) suitable for adaptation in accord with the teachings hereof.

The module 12 embodies the rules 18 in a network representation 14, e.g., an if-then-else network, or the like, native to the Jess environment. The network nodes are preferably executed so as to effect substantially parallel operation of the rules 18, though they can be executed so as to effect serial and/or iterative operation as well or in addition. In other embodiments, the rules are represented in accord with the specifics of the corresponding engine, if-then-else network, or other software, firmware and/or hardware environment on which the embodiment is implemented. These likewise preferably effect parallel execution of the rules 18, though they may effect serial or iterative execution instead or in addition.

The data set 10 is a directed graph, e.g., a collection of nodes representing data and directed arcs connecting nodes to one another. As used herein, a node at the source of an arc is referred to as an "ancestor" (or "direct ancestor"), while the node at the target of the arc is referred to herein as a "descendent" (or "direct descendent"). In the illustrated embodiment, each arc has an associated type or name, e.g., in the manner of predicates of RDF triples—which, themselves, constitute and/or form directed graphs.

By way of example, in addition to RDF triples, the data set 10 can comprise data structures representing a meta directed graph of the type disclosed in copending, commonly assigned U.S. patent application Ser. No. 10/138,725, filed May 3, 2002, entitled "Methods And Apparatus for Visualizing Relationships Among Triples of Resource Description Framework (RDF) Data Sets, e.g., at FIG. 4A-6B and accompanying text, all of which incorporated herein by reference.

Alternatively or in addition, the data set 10 can comprise RDF triples of the type conventionally known in the art and described, for example, in *Resource Description Framework (RDF) Model and Syntax Specification* (Feb. 22, 1999). Briefly, RDF is a way of expressing the properties of items of data. Those items are referred to as subjects or resources. Their properties are referred to as predicates. And, the values of those properties are referred to as objects. In RDF, an expression of a property of an item is referred to as a triple, a convenience reflecting that the expression contains three parts: subject, predicate and object. Subjects can be anything that is described by an RDF expression. A predicate identifies a property of a subject. An object gives a "value" of a property. Objects can be literals, i.e., strings that identify or name the corresponding property (predicate). They can also be resources.

The data set 10 may be stored on disk for input to module 12. Alternatively, or in addition, the data set may be a data flow, e.g., a stream of data (real-time or otherwise) originating from e-commerce, point-of-sale or other transactions or sources (whether or not business- or enterprise-oriented).. Moreover, the data set may comprise multiple parts, each operated on by module 12 at different times—for example, a first part representing a database and a second part representing updates to that database.

Criteria 16 contains expressions including, for example, literals, wildcards, Boolean operators and so forth, against which nodes in the data set are tested. In embodiments that operate on RDF data sets, the criteria can specify subject, predicate and/or object values or other attributes. In embodiments that operate on directed graphs of other types other appropriate values and attributes may be specified. Criteria can be input by a user, e.g., from a user interface, e.g., on an ad hoc basis. Alternatively or in addition, they can be stored and re-used, such as where numerous data sets exist of which the same criteria is applied. Further, the criteria 16 can be generated via dynamically, e.g., via other software (or hardware) applications.

Rules 18 define the tests for identifying data in the data set 20 that match the criteria or that are related thereto. These are expressed in terms of the types and values of the data items as well as their interrelationships or connectedness.

Rules applicable to a data set comprised of RDF triples can be expressed as follows:

| Rule No. | Purpose | Rule |
|---|---|---|
| 0 ("Criteria Rule") | Match criteria to triples in data set | If triple's object is a literal, identify triple as related if both triple's predicate and the object match those specified in the criteria.<br>If triple's object is a resource, identify triple as related if triple's predicate matches that specified in criteria, if any, and if triples object matches that specified in criteria. |
| 1 ("Sibling Rule") | Find as related other triples at the same level | Identify as related a triple that shares the same subject (i.e., siblings), except those siblings that have the same predicate as that specified in the criteria. |
| 2 ("Ancestor Rule") | Walk up the directed graph to find valid triples. | Identify as related a triple that is a direct ancestor of a triple identified by any of the other rules and that is not in substantial conflict with the criteria;<br>For purposes hereof, a triple whose object is the subject of another triple is deemed a direct ancestor of that other triple; a triple whose subject is the object of another triple is deemed a direct descendent of that other triple. |
| 3 ("Descendent Rule") | Walk down the directed graph to find valid triples. | Identify as related a triple (hereinafter "identified descendent") that is a direct descendent of a triple (hereinafter "identified ancestor") identified as related by any of the other rules and which identified descendent<br>(a) is not associated with the identified ancestor via a predicate substantially matching a predicate named in the criteria, if any, and<br>(b) is not in substantial conflict with the criteria;<br>(c) is not associated with the identified ancestor via a predicate matching a predicate by which the identified ancestor is associated with a triple, if any, as a result of which the identified ancestor was identified during execution of the Ancestor Rule. |

As used above and throughout "substantial conflict" means conflict that is direct or otherwise material in regard to determining related data vis-a-vis the use for which the invention is employed (e.g., as determined by default in an embodiment and/or by selection made by a user thereof). By way of non-limiting example, for some uses (and/or embodiments) differences of any sort between the object of an RDF triple and that specified in a criteria are material, while for other uses (and/or embodiments) differences with respect to suffix, case and/or tense are immaterial. Those skilled in the art will appreciate that for other uses and/or embodiments, factors other than suffix, case and/or tense may be used in determining materiality or lack thereof.

Rules applicable to other directed graphs (e.g., not comprised of RDF triples) can be expressed as shown below. As noted above, these other directed graphs can include the aforementioned meta directed graphs, by way of non-limiting example. It will be appreciated that the rules which follow are functionally equivalent to those expressed above. However, they take into that the data nodes in those other directed graphs may have attributes in addition to those represented in their connectedness to other data nodes. To this end, the aforementioned Sibling Rule is subsumed in those aspects of the rules that follow which call for testing each data node to determine whether they conflict with the criteria.

| Rule No. | Purpose | Rule |
| --- | --- | --- |
| 0 ("Criteria Rule") | Match criteria to data in data set | Identify as related data substantially matching a criteria; |
| 1 (Ancestor Rule) | Walk up the directed graph to find valid data | Identified as related data that is a direct ancestor of data identified in any of these rules, and that is not in substantial conflict with the criteria; |
| 2 (Descendent Rule) | Walk down the directed graph to find valid data | Identify as related data (hereinafter "identified descendent") that is a direct descendent of data (hereinafter "identified ancestor") identified as related in any of these rules, and which identified descendent: (a) Does not have a named relationship with the identified ancestor substantially matching a relationship named in the criteria, if any, and (b) Is not in substantial conflict with the criteria; and (c) Does not have a named relationship with the identified ancestor matching a relationship the identified ancestor has with a data, if any, as a result of which the identified ancestor was identified during execution of Rule 1. |

Referring to back to FIG. 1, the related data 20 output or otherwise generated by module 12 represents those nodes or triples identified as "related" during exercise of the rules. The data 20 can be output in the same form as the input data or some alternate form, e.g., pointers or other references to identified data within the data set 10. In some embodiments, it can be displayed via a user interface or printed, or digitally communicated to further applications for additional processing, e.g., via a network or the Internet. In one non-limiting example, the related data 20 can be used to generate mailings or to trigger message events.

In operation, the module 12 is loaded with rules 18. In the illustrated embodiment, this is accomplished via compilation of source code embodying those rules (expressed above in pseudo code) in the native or appropriate language of the expert system engine or other environment in which the module is implemented. See, step A. Of course, those skilled in the art will appreciate that, alternatively, rules in source code format can be retrieved at run time and interpreted instead of compiled.

The criteria 16 is then supplied to the module 12. See, step B. These can be entered by an operator, e.g., via a keyboard or other input device. Alternatively, or in addition, they can be retrieved from disk or input from another application (e.g., a messaging system) or device, e.g., via network, interprocess communication or otherwise.

The data set 10 is applied to the module 12 in step C. The data set 10 can be as described above, to wit, a RDF data set or other directed graph stored in a data base or contained in a data stream, or otherwise. The data set can be applied to the module 12 via conventional techniques known in the art, e.g., retrieval from disk, communication via network, or via any other technique capable of communicating a data set to a digital application.

In step D, the module 12 uses the rules 18 to apply the criteria 16 to the data set 10. In the illustrated embodiment, by way of non-limiting example, this step is executed via the network 14 configured (via the rules engine) in accord with the rules. In other embodiments, this step is executed via the corresponding internal representation of those rules.

Triples (in the case of RDF data sets) or data (in the case of data sets comprising other types of directed graphs) identified by the module as "related"—meaning, in the context hereof, that those triples match the criteria or are related thereto—are output as "identified data" in Step D. As described above, the output can be a list or other tabulation of identified data 20, or it can be a pointer or reference to that data, for example, a reference to a location within the data set 10.

In some embodiments, the output of identified data 20 can be stored for future use, e.g., for use with a mail-merge or other applications. In other embodiments, it can be digitally communicated to other data base systems or information repositories. Still further, in some embodiments, it can be added to a data base containing other related data, or even replace portions of that data based.

The table below lists a directed graph—here, the triples of an RDF data set—of the type suitable for processing by module 12 to identify data matching a criteria and related thereto. It will be appreciated that in practice, directed graphs processed by module 12 may contain hundreds, thousands or more nodes, e.g., as would be typical for an RDF set representing transactional and enterprise-related data. Moreover, it will be appreciated that the directed graphs and/or triples are typically expressed in a conventional data format (e.g., XML), or otherwise, for transfer to and from the module 12.

| Subject | Predicate | Object |
| --- | --- | --- |
| company://id#3 | customer | company://id#1 |
| company://id#3 | customer | company://id#4 |
| company://id#3 | customer | company://id#2 |

-continued

| Subject | Predicate | Object |
|---|---|---|
| company://id#1 | employee | Howard |
| company://id#1 | employee | Alan |
| company://id#1 | CTO | Colin |
| company://id#2 | employee | David |
| company://id#2 | CTO | Colin |

Figure 2:
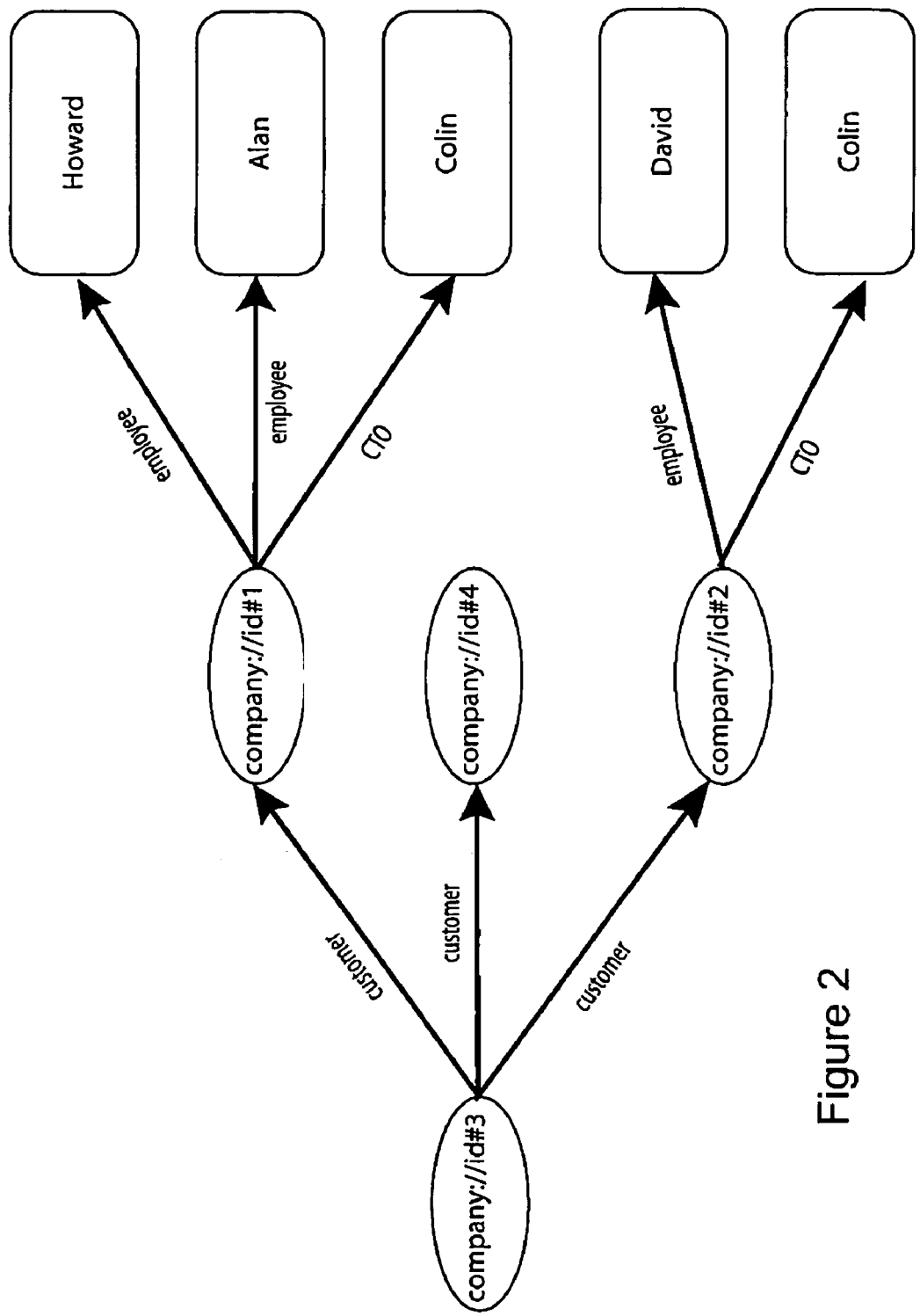
FIG. 2 depicts a data set suitable for processing by a methods and apparatus according to the invention.

FIG. 2 is a graphical depiction of this directed graph, i.e., RDF data set. Per convention, subjects and resource-type objects are depicted as oval-shaped nodes; literal-type objects are depicted as rectangular nodes; and predicates are depicted as arcs connecting those nodes.

Figure 3:
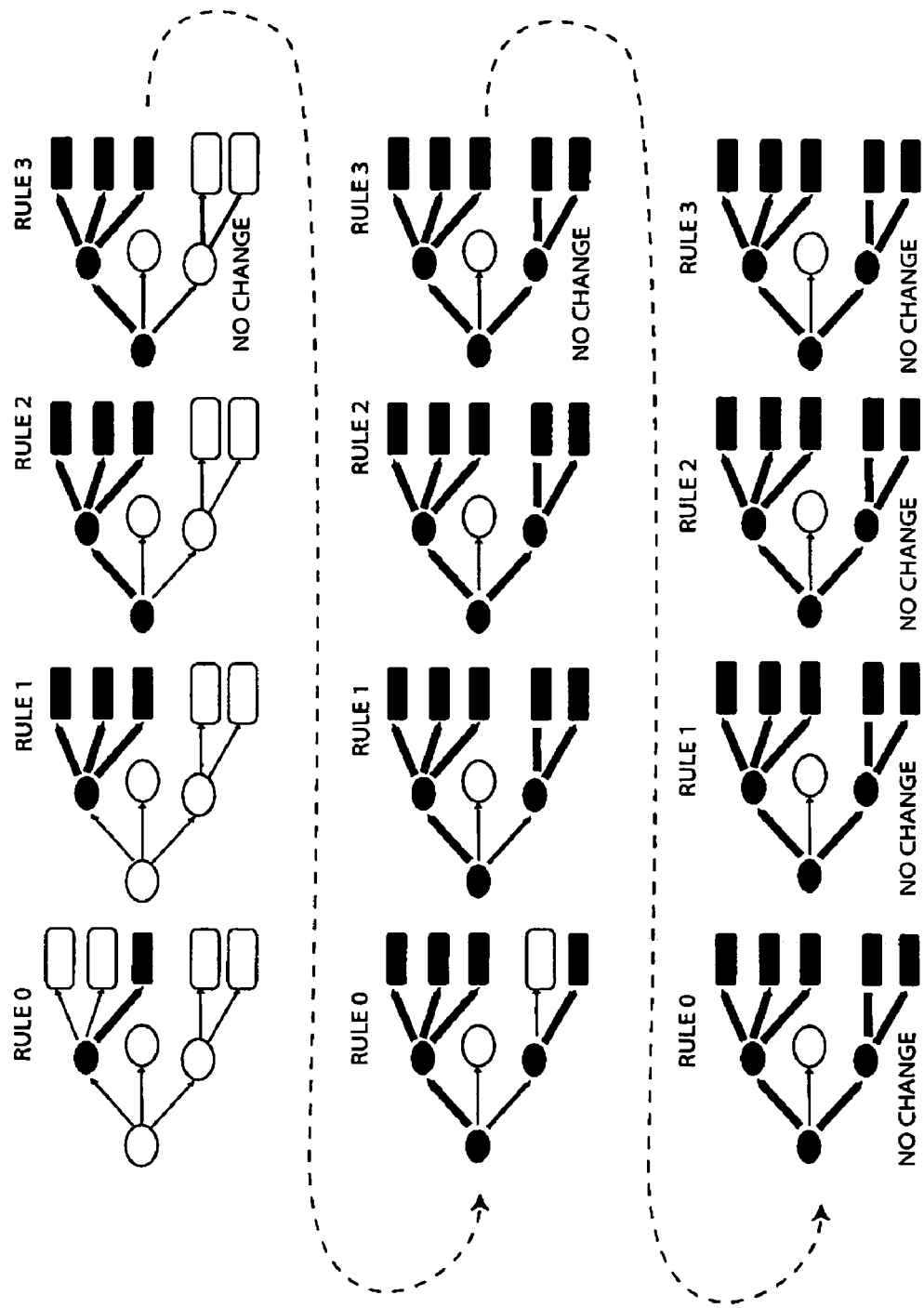
FIGS. 3-5 depict operation of the system of FIG. 1 on the data set of FIG. 2 with different criteria.

FIG. 3 depicts application by module 12 of criteria on the data set shown in FIG. 2 using the above-detailed rules, specifically, those of the RDF type. The criteria is predicate=CTO and object=Colin. The depiction is simplified insofar as it shows execution of the rules serially: in practice, a preferred module 12 implemented in a rules engine (such as Jess) executes the rules in accord with the engine's underlying algorithm (e.g., a Rete algorithm as disclosed by Forgy, "Rete: A Fast Algorithm for the Many Pattern/Many Object Pattern Match," Problem Artificial Intelligence, 19(1982) 17-37, by http://herzberg.ca.sandia.gov/jess/docs/52/ rete-.html; or other underlying algorithm).

In a sequence of twelve frames, the depiction shows successive identification of triples as "related" (i.e., matching the criteria or related thereto) as each rule is applied or re-applied. The illustrated sequence proceeds from left-to-right then top-to-bottom, as indicated by the dashed-line arrows. For sake of simplicity, the data set is depicted in abstract in each frame, i.e., by a small directed graph of identical shape as that of FIG. 2, but without the labels. Triples identified as related are indicated in black.

Referring to the first frame of FIG. 3, the module 12 applies the Criteria Rule to the data set. Because the company://id#1—CTO—Colin triple matches the criteria (to repeat, predicate=CTO and object=Colin), it is identified as "related" and marked accordingly.

In the second frame, the module applies the Sibling Rule to find triples at the same level as the one(s) previously identified by the Criteria Rule. In this instance, the company://id#1—employee—Howard and company://id#1—employee—Alan triples are identified and marked accordingly.

In the third frame, the module applies the Ancestor Rule to walk up the directed graph to find ancestors of the triples previously identified as related. In this instance, the company:// id#3—customer—company://id#1 triple is identified and marked accordingly.

In the fourth frame, the module applies the Descendent Rule to walk down the directed graph to find descendents of the triples previously identified as related. No triples are selected since both company://id#3—customer—company:// id#2 and company://id#3—customer—company://id#4 share the same predicate as company://id#3—customer—company://id#1. Referring back to the detailed rules, company:// id#2, by way of example, is a direct descendent that has a predicate (to wit, customer) connecting it with its identified direct ancestor (to wit, company://id#3) which matches a predicate that ancestor (to wit, company://id#3) has with a direct descendent (to wit, company://id#1) via which that direct ancestor (to wit, company:// id#3) was identified during the execution of the Ancestor Rule.

In frames 5-8, the module 12 reapplies the rules, this time beginning with a Criteria Rule match of company://id#2—CTO—Colin. In frames 9-12, the module 12 finds no further matches upon reapplication of the rules.

Figure 4:
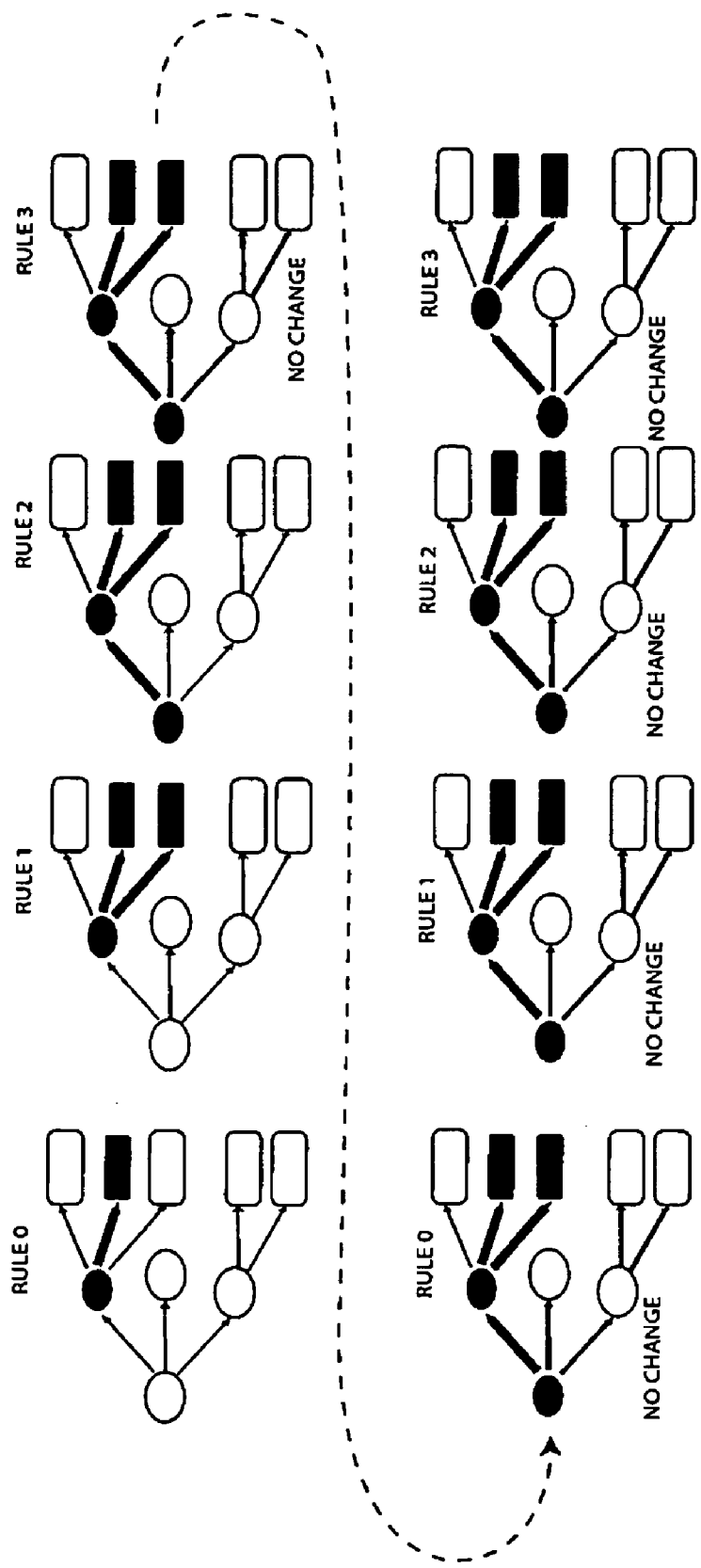

FIG. 4 parallels FIG. 3, showing however application by module 12 of the criteria predicate=employee and object=Alan to the data set of FIG. 2. Only eight frames are shown since module 12 finds no further matches during execution of the rules represented in the final four frames.

Of note in FIG. 4 is frame two. Here, application of the Sibling Rule by module 12 does not result in identification of all of the siblings of company://id#1—employee—Alan (which had been identified as relevant in the prior execution of the Criteria Rule). This is because, one of siblings company://id#1—employee—Howard has the same predicate as that specified in the criteria. Accordingly, that triple is not identified or marked as related.

Figure 5:
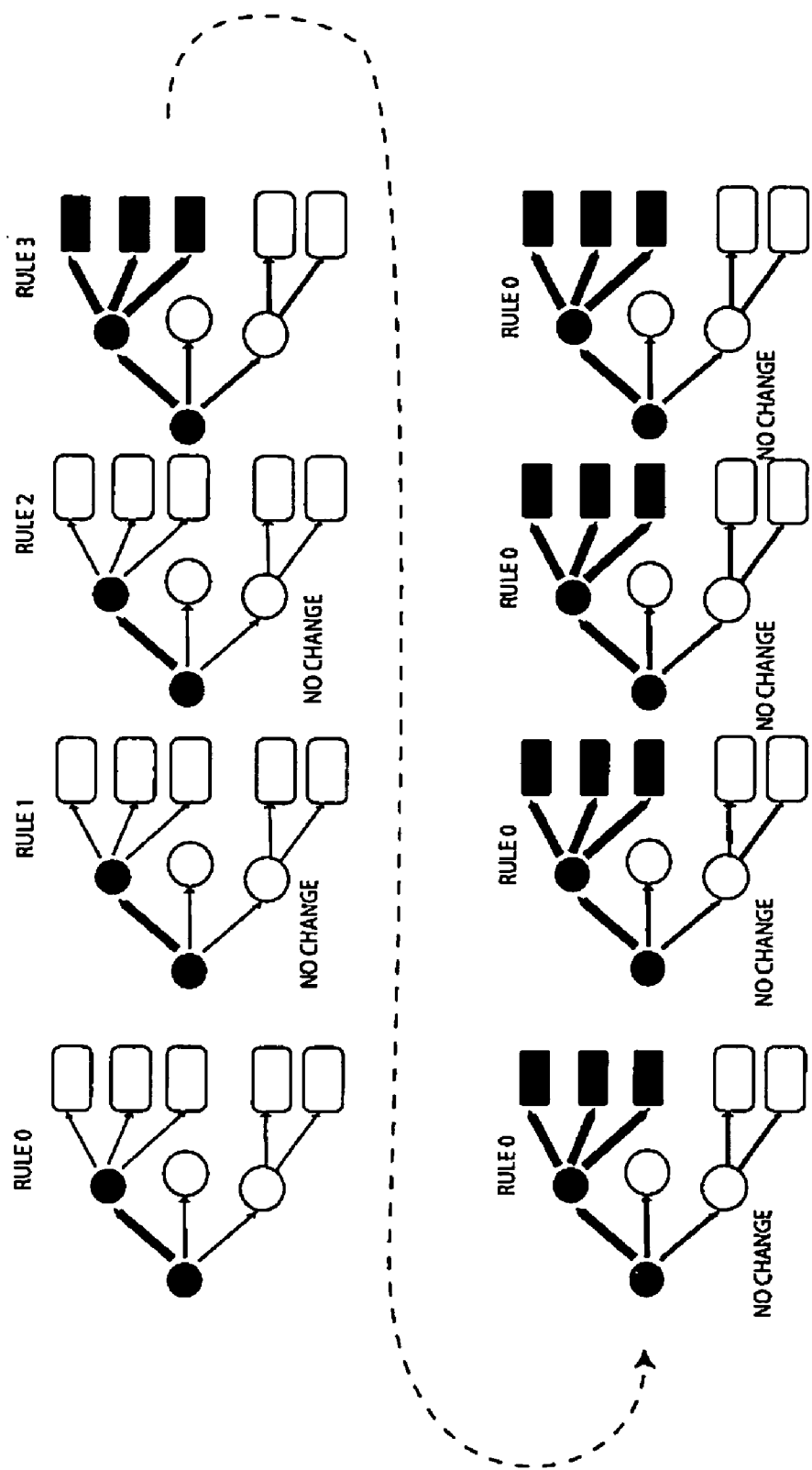

FIG. 5 also parallels FIG. 3, showing however application by module 12 of the criteria resource=company.//id#1 to the data set of FIG. 2. Again, only eight frames are shown since module 12 finds no further matches during execution of the rules represented in the final four frames. Of note in FIG. 5 is the identifications effected by specification of a resource as a criteria.

A further understanding of these examples may be attained by reference the Appendices A and B, filed herewith, which provide XML/RDF listings of the data sets and criteria, and which also show rule-by-rule identification or ("validation") of the triples.

Though the examples show application of the rules by module 12 to an RDF data set, it will be appreciated that alternate embodiments of the module can likewise apply the rules to data sets representing the meta directed graphs disclosed in copending, commonly assigned application U.S. patent application Ser. No. 10/138,725, filed May 3, 2002, entitled "Methods And Apparatus for Visualizing Relationships Among Triples of Resource Description Framework (RDF) Data Sets," the teachings of which are incorporated herein by reference.

Described above are methods and apparatus meeting the desired objects. Those skilled in the art will, of course, appreciate that these are merely examples and that other embodiments, incorporating modifications to those described herein fall within the scope of the invention, of which we claim:

The invention claimed is:

1. A method for identifying related triples in a resource description framework (RDF) data set, comprising
   A. executing, on a digital data processing system, with respect to the data set the sub-steps of
      (i) identifying as related a triple substantially matching a criteria;
      (ii) identifying as related a triple that is a direct ancestor of a triple identified as related in any of sub-steps (i), (ii) and (iii), and that is not in substantial conflict with the criteria,
         where a triple whose object is the subject of another triple is deemed a direct ancestor of that other triple, and, conversely, where a triple whose subject is the object of another triple is deemed a direct descendent of that other triple,
         wherein sub-step (iii) is defined below;
      (iii) identifying as related a triple (hereinafter "identified descendent") that is a direct descendent of a triple (hereinafter "identified ancestor") identified as related in any of sub-steps (i), (ii) and (iii), and which identified descendent
         (a) is not associated with the identified ancestor via a predicate substantially matching a predicate named in the criteria, if any, and (b) is not in substantial conflict with the criteria;

(c) is not associated with the identified ancestor via a predicate matching a predicate by which the identified ancestor is associated with a triple, if any, as a result of which the identified ancestor was identified during execution of sub-step (ii), (iv) identifying as related a triple that is a sibling of another triple identified as related in sub-step (i) and that is not in substantial conflict with the criteria, where triples that share a common subject are deemed siblings B. generating an indication of triples identified as related in step (A), C. wherein the criteria specifies a predicate and an object associated with that predicate, and wherein sub-step (ii) includes comparing at least one of the predicate and object specified in the criteria with the direct ancestor in order to determine whether the direct ancestor is in substantial conflict with the criteria.

2. A method for identifying related triples in a resource description framework (RDF) data set, comprising A. executing, on a digital data processing system, with respect to the data set the sub-steps of (i) identifying as related a triple substantially matching a criteria;

(ii) identifying as related a triple that is a direct ancestor of a triple identified as related in any of sub-steps (i), (ii) and (iii), and that is not in substantial conflict with the criteria, where a triple whose object is the subject of another triple is deemed a direct ancestor of that other triple, and, conversely, where a triple whose subject is the object of another triple is deemed a direct descendent of that other triple, wherein sub-step (iii) is defined below;

(iii) identifying as related a triple (hereinafter "identified descendent") that is a direct descendent of a triple (hereinafter "identified ancestor") identified as related in any of sub-steps (i), (ii) and (iii), and which identified descendent (a) is not associated with the identified ancestor via a predicate substantially matching a predicate named in the criteria, if any, and (b) is not in substantial conflict with the criteria;

(c) is not associated with the identified ancestor via a predicate matching a predicate by which the identified ancestor is associated with a triple, if any, as a result of which the identified ancestor was identified during execution of sub-step (ii), B. generating an indication of triples identified as related in step (A), C. wherein the criteria specifies a predicate and an object associated with that predicate, and wherein sub-step (ii) includes comparing at least one of the predicate and object specified in the criteria with the direct ancestor in order to determine whether the director ancestor is in substantial conflict with the criteria.

3. A method for identifying related triples in a resource description framework (RDF) data set, comprising A. executing, on a digital data processing system, with respect to the data set the sub-steps of (i) identifying as related a triple substantially matching a criteria;

(ii) identifying as related a triple that is a direct ancestor of a triple identified as related in any of sub-steps (i), (ii) and (iii), and that is not in substantial conflict with the criteria, where a triple whose object is the subject of another triple is deemed a direct ancestor of that other triple, and, conversely, where a triple whose subject is the object of another triple is deemed a direct descendent of that other triple, wherein sub-step (iii) is defined below;

(iii) identifying as related a triple (hereinafter "identified descendent") that is a direct descendent of a triple (hereinafter "identified ancestor") identified as related in any of sub-steps (i), (ii) and (iii), and which identified descendent (a) is not associated with the identified ancestor via a predicate substantially matching a predicate named in the criteria, if any, and (b) is not in substantial conflict with the criteria;

(c) is not associated with the identified ancestor via a predicate matching a predicate by which the identified ancestor is associated with a triple, if any, as a result of which the identified ancestor was identified during execution of sub-step (ii), B. generating an indication of triples identified as related in step (A), C. wherein the criteria specifies a predicate and an object associated with that predicate, and wherein sub-step (iii) includes comparing at least one of the predicate and object specified in the criteria with the identified descendent in order to determine whether the identified descendent ancestor is in substantial conflict with the criteria.

4. A method for identifying related triples in a resource description framework (RDF) data set, comprising A. executing, on a digital data processing system, the sub-steps of (i) identifying as related a triple substantially matching a criteria;

(ii) identifying as related a triple that is a direct ancestor of a triple identified as related in any of sub-steps (i), (ii) and (iii), and that is not in substantial conflict with the criteria, where a triple whose object is the subject of another triple is deemed a direct ancestor of that other triple, and, conversely, where a triple whose subject is the object of another triple is deemed a direct descendent of that other triple, wherein sub-step (iii) is defined below;

(iii) identifying as related a triple (hereinafter "identified descendent") that is a direct descendent of a triple (hereinafter "identified ancestor") identified as related in any of sub-steps (i), (ii) and (iii), and which identified descendent (a) is not associated with the identified ancestor via a predicate substantially matching a predicate named in the criteria, if any, and (b) is not in substantial conflict with the criteria;

(c) is not associated with the identified ancestor via a predicate matching a predicate by which the identified ancestor is associated with a triple, if any, as a result of which the identified ancestor was identified during execution of sub-step (ii), B. generating an indication of triples identified as related in step (A), C. executing step (A) with respect to a first data set of RDF triples, and D. executing step (A) separately with respect to a second, related data set of RDF triples, E. wherein the criteria specifies a predicate and an object associated with that predicate, and wherein sub-step (ii) includes comparing at least one of the predicate and object specified in the criteria with the direct ancestor in order to determine whether the direct ancestor is in substantial conflict with the criteria.

5. A method of claim 4, wherein the second data set comprises an update to the first data set.

6. A method for identifying related triples in a resource description framework (RDF) data set, comprising A. executing, on a digital data processing system, with respect to the data set the sub-steps of
   (i) identifying as related a triple substantially matching a criteria;
   (ii) identifying as related a triple (hereinafter "identified descendent") that is a direct descendent of a triple (hereinafter "identified ancestor") identified as related in any of sub-steps (i) and (ii), and which identified descendent
      (a) is not associated with the identified ancestor via a predicate substantially matching a predicate named in the criteria, if any, and
      (b) is not in substantial conflict with the criteria;
      (c) is not associated with the identified ancestor via a predicate matching a predicate by which the identified ancestor is associated with a triple, if any, as a result of which the identified ancestor was identified as related, where a triple whose object is the subject of another triple is deemed a direct ancestor of that other triple, and, conversely, where a triple whose subject is the object of another triple is deemed a direct descendent of that other triple;

B. generating an indication of triples identified as related in step (A),

C. wherein the criteria specifies a predicate and an object associated with that predicate, and wherein sub-step (ii) includes comparing at least one of the predicate and object specified in the criteria with the identified descendent in order to determine whether the identified descendent is in substantial conflict with the criteria.

7. The method of claim 6, wherein the data set comprises a data flow.

8. The method of claim 7, wherein the data flow comprises any of transactional information and enterprise-related information.

9. The method of claim 6, comprising
executing step (A) with respect to a first data set of RDF triples,
executing step (A) separately with respect to a second, related data set of RDF triples.

10. The method of claim 9, wherein the second data set comprises an update to the first data set.

* * * * *

UNITED STATES PATENT AND TRADEMARK OFFICE
CERTIFICATE OF CORRECTION

PATENT NO. : 7,613,712 B2  Page 1 of 1
APPLICATION NO. : 11/245994
DATED : November 3, 2009
INVENTOR(S) : Greenblatt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this

Nineteenth Day of October, 2010

David J. Kappos
*Director of the United States Patent and Trademark Office*